No. 821,586. PATENTED MAY 22, 1906.
E. W. GOUGH.
CIRCUIT BREAKER.
APPLICATION FILED DEC. 30, 1904.
2 SHEETS—SHEET 2.
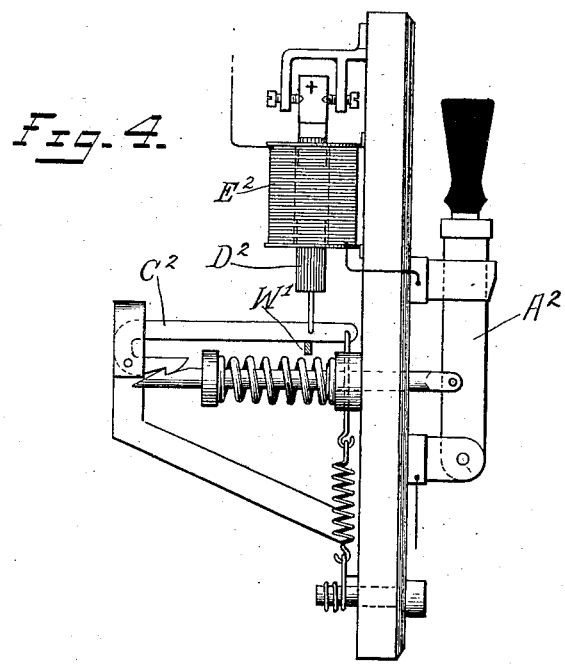
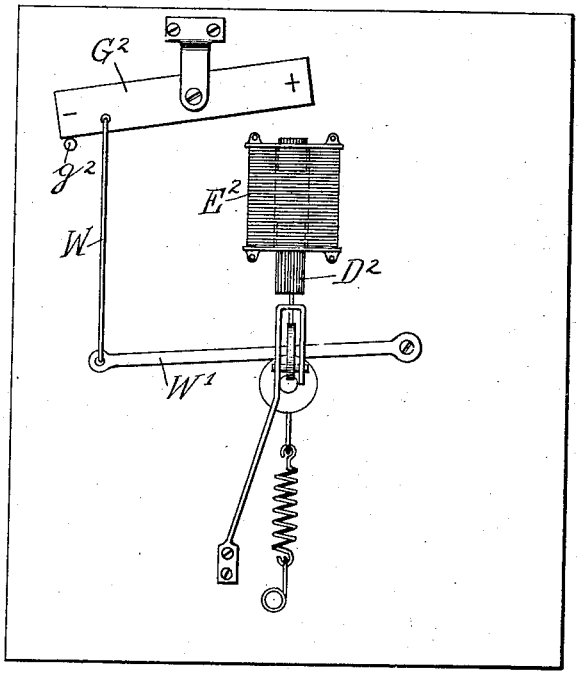
Witnesses
Geo. V. Rasmussen
Inventor
EDGAR W. GOUGH
By his Attorneys

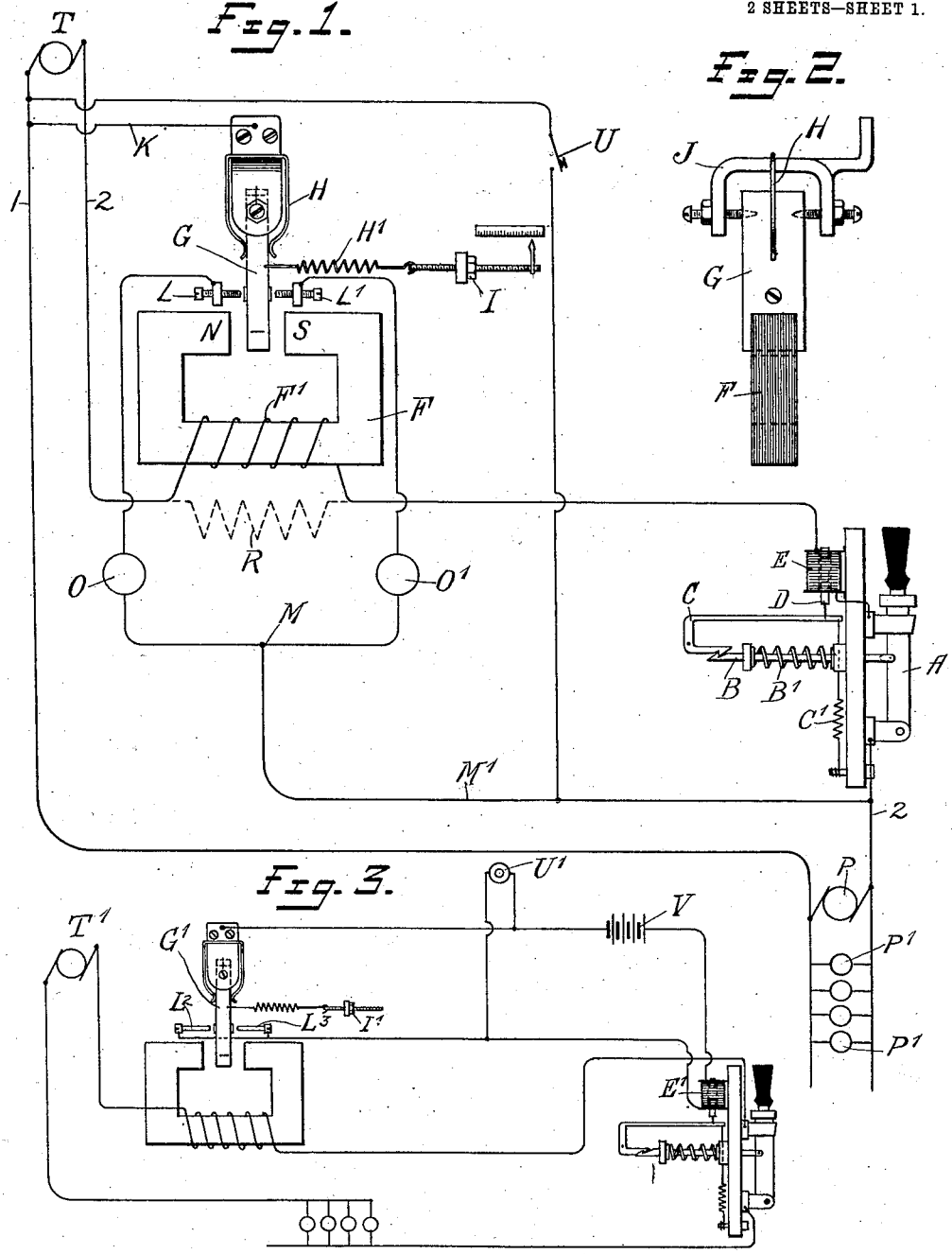

UNITED STATES PATENT OFFICE.

EDGAR W. GOUGH, OF GREAT BARRINGTON, MASSACHUSETTS, ASSIGNOR TO STANLEY INSTRUMENT COMPANY, OF GREAT BARRINGTON, MASSACHUSETTS, A CORPORATION OF MASSACHUSETTS.

CIRCUIT-BREAKER.

No. 821,586.     Specification of Letters Patent.     Patented May 22, 1906.

Application filed December 30, 1904. Serial No. 238,912.

*To all whom it may concern:*

Be it known that I, EDGAR W. GOUGH, a citizen of the United States, residing at Great Barrington, county of Berkshire, and State of Massachusetts, have invented certain new and useful Improvements in Circuit-Breakers, of which the following is a full, clear, and exact description.

My invention relates to improvements in circuit-breakers, and has for its object to provide a circuit-breaker which will be automatically operated when there is an overload on the circuit and also when the current is reversed in direction. The former condition arises when there is a short circuit on the lines or when too many translating devices have been connected with the mains. The other condition is one that arises when for any reason the generator changes its polarity or when storage batteries are being charged and the generator is shut down before the batteries are disconnected, allowing the batteries to discharge through the generator. It is also liable to occur when one electric circuit or a whole system of electrical distribution is supplied from two or more sources of current, such as two or more generators connected in parallel, in which case if one of the generators or other source of current ceases to supply current without being disconnected the current will be reversed through the apparatus. It may also occur where direct-current generators are operating in parallel, in which for some reason the polarity of one or more of the generators becomes reversed, thus causing the current to flow in the opposite direction through the machine and circuits, or on any installation where it is desirable that the current shall always flow in the same direction. Switches embodying my invention are designed to meet these and similar emergencies of overloading or reversal.

My invention may also be embodied in other circuit-breakers responding to under-load or to overvoltage or undervoltage.

The following is a description of apparatus embodying my invention, reference being had to the accompanying drawings, in which—

Figure 1 shows the preferred form of such apparatus. Fig. 2 is a detail of the apparatus of Fig. 1. Fig. 3 is a modification of the apparatus shown in Figs. 1 and 2. Fig. 4 is a side elevation of a further modification. Fig. 5 is a front elevation of the apparatus of Fig. 4.

Referring more particularly to the drawings, A is a switch-arm to which is pivoted a rod B, which is engaged by a latch C, connected to the movable soft-iron core D of the solenoid or electromagnet E. The solenoid or magnet E in this particular embodiment is in series with the switch-arm A and with the translating devices. The latch C is restrained by a tension-spring C', connected thereto (the rod B being slotted or cut so as to permit a direct connection) and to an adjustable device in the base-board of the switch, whereby the tension on the spring may be changed. In series with the electromagnet E is another electromagnet having a core F excited by the energizing-coil F'. This coil F' may, if desired, be shunted by a resistance R, (shown in dotted lines,) so that only a given proportion of the current flows through the coil. The poles of the core F are so disposed as to embrace one of the poles of a polarized armature G, the same preferably consisting of a permanent magnet. This polarized armature is pivoted at its upper end and is normally held in central position between the poles of the core F by springs H H'. The tension of the spring H' by means of the adjusting-nut I can be adjusted as desired. The armature G through its pivots and support J and the conductor K is electrically connected to the main 1, leading from the direct-current generator T. The other main 2, leading from the generator, is in series with the energizing-coil F'. On each side of the armature G are adjustable contacts L L', from which lead conductors to a common point M, from which a conductor M' leads to the main 2 beyond the switch-arm A. In the conductors leading from the contacts L L' are two lamps or other indicating devices O O' for the purpose hereinafter described. P P' represent motors, lamps, or other translating devices connected to the mains.

The operation of the apparatus is as follows: The armature G is adjusted so as to normally be in substantially central position and out of engagement with either of the contacts L L'. Assuming that the armature G is polarized, so that the lower end is negative, and that when the generator T is in normal operation the magnet-core F is polarized by the current flowing so as to have the pole S to the right of the armature G of negative polarity and the pole N to the left of the armature G of positive polarity, then when for any reason an overload occurs upon the circuit the core F will be so strongly energized as to draw the lower end of the armature G to the left, causing an engagement to be made with the contact L. This will complete the circuit from the main 1 through the conductor K, armature G, contact L, indicating device O, conductor M', to the main 2, the switch-arm A, solenoid E, magnetizing-coil F', back to the generator. This being a circuit of low resistance will cause such an abnormal current to flow through the solenoid E as to at once draw up its core D and release the catch C from the arm B. The spring B', which is a contraction-spring, one end of which is fastened to the boss on the base-board, while the other end is fastened to a projection on the rod B, will at once force the switch-arm A away from the switch-contacts, thus automatically opening the circuit. In case there is a reversal of the current the core F is given the opposite polarity, so that the pole N becomes negative and the pole S positive and the armature G is attracted to the right, making engagement with the contact L'. The circuit from the armature G is then through the contact L', indicating device O', to the common point M, from which it follows the same path as in the former instance. The solenoid E is energized in a reverse direction, but acts in the same way to draw up its soft-iron core D and release the switch-arm A.

In case the operator desires to open the switch-arm A at any time a push-button U is provided, which when actuated completes a local circuit between the mains 1 and 2 through the solenoid E, producing the same result as though the local circuit had been established by the movement of the armature G. Such push-buttons can be placed at a number of points at which it is desirable to be able to control the circuit.

In the modification shown in Fig. 3 the arrangement is similar to that shown in Fig. 1, with the exception that instead of employing a local circuit connected to the generator-mains for actuating the solenoid E an independent local circuit is employed connected to another electrical source, such as a battery V. In this modification the parts and arrangements are the same as those shown in Fig. 1, with the exception that the armature G', which corresponds to the armature G, and the contacts $L^2$ $L^3$, which correspond to the contacts L L', and the solenoid E', which corresponds to the solenoid E, are in circuit with the battery V and not connected to the mains. The armature G is actuated by the overload or the reverse current in the same manner as that of the apparatus of Fig. 1. The circuit which it establishes, however, in either case is from the contact $L^2$ or $L^3$ through the solenoid E', battery V, and armature G'.

The apparatus of Figs. 4 and 5 involve the same broad principles of the apparatus employing the polarized armature and capable of opening the circuit on either an overload or a reversed current. In this case the solenoid $E^2$ is wound so that an overload-current acting directly through it lifts its core $D^2$, so as to actuate the latch $C^2$ and release the switch-arm $A^2$. Above the solenoid $E^2$ is a polarized armature $G^2$, which is normally held in the position indicated, its further turning being prevented by a pin $g^2$. Assuming that the solenoid $E^2$ is so wound that with a normal current the polarity of its upper end will be positive, the armature $D^2$ is so magnetized that the polarity of its adjacent end is also positive, as indicated. The left-hand end of the armature G is connected by a link W to an arm W', which passes beneath the latch $C^2$ and is pivoted at a point to the right thereof. In case of an overload-current the armature $G^2$ remains stationary, its positively-polarized end being repelled by the solenoid $E^2$. The solenoid $E^2$ by reason of the direct action of the overload-current draws up its core $D^2$, and thereby releases the latch $C^2$, so as to release the switch-arm $A^2$. In case, however, the current is reversed the solenoid $E^2$ not only tends to draw up its core $D^2$, but also attracts the right-hand end of the armature $G^2$. This elevates the left-hand end of the armature $G^2$, which raises the rod W', so as to assist in lifting the latch $C^2$. This combined action which takes place through the direct pull of the core $D^2$ and the polarized armature $G^2$ is sufficient to raise the latch $C^2$ when a reversed current of any considerable proportions passes through it.

My invention is capable of being embodied in various other forms which may be used in various relations to accomplish the same or similar results, as will be evident to those skilled in the art, so that I do not wish to be limited to the exact mechanical constructions shown or to an embodiment of my invention used only for the particular purposes specified.

What I claim is—

1. In a switch the combination of an electromagnet, a polarized armature therefor and means controlled by said electromagnet and armature for opening said circuit when the current is abnormally large or is reversed in direction.

2. In a switch, the combination of a switch-arm, a catch holding same closed, an electromagnet and means controlled by said electromagnet for releasing said catch when the current passing through said electromagnet is abnormal in amount or is reversed in direction.

3. In combination, a source of current, a circuit leading therefrom, a switch controlling said circuit, a restraining-catch for said switch, an electromagnet in series with said switch, a polarized armature therefor, an electromagnetic device for releasing said restraining-catch and a local circuit for energizing said electromagnetic device, said local circuit having contacts adapted to be engaged by a movement of said armature in either direction and close the circuit through said electromagnetic device whenever the current through the electromagnet is abnormal in amount or is reversed in direction.

4. In combination, a source of electric current, a circuit leading therefrom, a switch for opening and closing said circuit, means tending to open said switch, a catch for restraining the same, a magnet energized from said source, an electromagnetic device for releasing said catch, a local circuit for energizing said electromagnetic device, contacts for said local circuit, means actuated by said magnet when energized either by a current abnormal in amount or by a reversed current to so engage said contacts as to close said local circuit.

5. In combination, a switch-arm, a spring actuating the same, a catch restraining said spring, a magnet for actuating said catch, a local circuit for said magnet, contacts for said local circuit, a second magnet, means actuated by said second magnet for engaging said contacts so as to close said local circuit whenever the current through said second circuit is abnormal in amount or is reversed in direction.

Signed at Great Barrington, Massachusetts, this 28th day of December, 1904.

EDGAR W. GOUGH.

Witnesses:
JOHN J. WELSH,
GEORGE T. FRENCH.